(12) United States Patent
Kim et al.

(10) Patent No.: US 7,510,748 B2
(45) Date of Patent: *Mar. 31, 2009

(54) BROADBAND REFLECTION TYPE BRIGHTNESS ENHANCEMENT POLARIZER AND LIQUID CRYSTAL DISPLAY HAVING THE SAME

(75) Inventors: Sung-Tae Kim, Seoul (KR); Ki-Cheol Yoon, Chungcheongnam-do (KR); Keon-Il Kim, Deajeon (KR); Nam Ki, Gyeonggi-do (KR); Hunkyun Pak, Gyeonggi-do (KR); Jea-Chul Jung, Daejeon (KR)

(73) Assignee: Samsung Fine Chemicals Co., Ltd., Ulsan (KR)

( * ) Notice: Subject to any disclaimer, the term of this patent is extended or adjusted under 35 U.S.C. 154(b) by 407 days.

This patent is subject to a terminal disclaimer.

(21) Appl. No.: 11/369,791

(22) Filed: Mar. 7, 2006

(65) Prior Publication Data

US 2006/0204681 A1    Sep. 14, 2006

(30) Foreign Application Priority Data

Mar. 9, 2005  (KR) .................... 10-2005-0019764
Apr. 21, 2005  (KR) .................... 10-2005-0033159
Apr. 21, 2005  (KR) .................... 10-2005-0033160

(51) Int. Cl.
*C09K 19/00*      (2006.01)
*C90K 19/52*      (2006.01)

(52) U.S. Cl. .................... 428/1.1; 428/1.2; 428/1.3; 349/176; 252/299.01; 252/299.6; 430/20

(58) Field of Classification Search ........... 428/1.1–1.3; 252/299.01, 299.6; 430/20, 270.1; 349/176
See application file for complete search history.

(56) References Cited

U.S. PATENT DOCUMENTS

2007/0159578 A1*  7/2007  Kim et al. .................... 349/98
2007/0166482 A1*  7/2007  Kim et al. .................... 428/1.1

* cited by examiner

*Primary Examiner*—Geraldina Visconti
(74) *Attorney, Agent, or Firm*—Husch Blackwell Sanders Welsh & Katz

(57) ABSTRACT

Disclosed is a broadband reflection type brightness enhancement polarizer, which includes a cholesteric liquid crystal film laminate having a broadband selective reflecting wavelength range in which a plurality of cholesteric liquid crystal films having selective reflecting wavelength ranges different from each other by having different mixture ratios of a curable nematic liquid crystal compound expressed by the chemical formula 1 and a curable chiral compound expressed by the chemical formula 2 are laminated; and a film having ¼λ phase difference laminated on one surface of the cholesteric liquid crystal film laminate. This polarizer has wide selective reflecting wavelength ranges of the cholesteric liquid crystal films composing the polarizer, so the entire visible ray range can be covered just by laminating several cholesteric liquid crystal films. Accordingly, the polarizer may be manufactured relatively thinner, so the brightness can be greatly improved when the polarizer is applied to a liquid crystal display.

8 Claims, 7 Drawing Sheets

BROADBAND REFLECTION TYPE BRIGHTNESS ENHANCEMENT POLARIZER AND LIQUID CRYSTAL DISPLAY HAVING THE SAME

BACKGROUND OF THE INVENTION

1. Field of the Invention

The present invention relates to a broadband reflection type brightness enhancement polarizer provided with a cholesteric liquid crystal film laminate in which a plurality of cholesteric liquid crystal films having selectively reflecting wavelength ranges different from each other are laminated, and a liquid crystal display having the polarizer.

2. Description of the Related Art

A display panel is broadly used as a display of electronic calculators, electronic watches or clocks, automobile navigators, office automation equipments, notebook computers, information communication terminals and so on. For example, a liquid crystal device is configured so that liquid crystal is injected between upper and lower panels that have a transparent electrode and an alignment layer therein to face with each other. A currently used liquid crystal device employs a linearly polarized light, so absorptive polarizers are arranged before and after a panel.

The absorptive polarizer is generally prepared by adsorbing iodine or dichroism die to a polyvinyl alcohol film and then elongating it. The polarizer prepared as mentioned above however has a weak mechanical strength in a direction of a transmission axis and is easily contracted due to heat or moisture, which results in serious deterioration of its polarizing function. Thus, this absorptive polarizer is attached between supports such as cellulose acetate films, when being used. The absorptive polarizer employing polyvinyl alcohol as mentioned above gives linearly polarized lights by absorbing light vibrating in one direction but transmitting light vibrating in another direction, so the efficiency of the polarizer cannot exceed 50% theoretically. It will be a main factor of deteriorating efficiency and brightness of LCD.

Meanwhile, if a reflective polarizer prepared using a cholesteric liquid crystal is additionally used between the reflector and the liquid crystal panel provided with the absorptive polarizer, the above drawbacks of the absorptive polarizer can be solved. The cholesteric liquid crystal is configured so that its liquid crystal is twisted in a spiral direction identical to a circular polarization direction, and it has a selective reflecting characteristic, which reflects only a light having circular polarization whose wavelength is identical to the spiral pitch of the liquid crystal. When using this selective reflecting characteristic, it is possible to make a polarizer that can convert a non-polarized light in a certain wavelength range into a circularly polarized light. That is to say, if a non-polarized light in which left and right circularly polarized lights are mixed half and half is put into a cholesteric liquid crystal film having a spiral structure rotating to the left or right, a circularly polarized light rotating in the same direction as the spiral direction is reflected and a circularly polarized light rotating in the opposite direction is transmitted. At this time, the transmitted circularly polarized light is changed into a linearly polarized light with passing through a film having ¼λ phase difference. Meanwhile, the reflected circularly polarized light changes its polarization direction when being reflected again on the reflector, so it passes through the liquid crystal film. Thus, if the polarizer prepared using a cholesteric liquid crystal film is additionally used, there is theoretically no loss of light, so brightness can be remarkably improved.

However, a backlight used in the liquid crystal device generates a light in a visual ray region (400 to 700 nm) that mainly gives colors, so the selective reflecting region of the cholesteric liquid crystal film should cover the entire visual ray region. If not, there exists a light transmitting through the polarizer in a non-polarized state, thereby deteriorating quality of the liquid crystal device. One cholesteric liquid crystal film cannot cover the entire visual ray region, so a plurality of cholesteric liquid crystal films having selective reflecting wavelength ranges different from each other are laminated to make the polarizer as disclosed in Korean Laid-open Patent Publication No. 1999-65280. However, commonly used cholesteric liquid crystal compounds have narrow selective reflecting wavelength ranges, so at least four cholesteric liquid crystal films should be laminated to cover the entire visual ray region. Accordingly, this technique has drawbacks that a polarizer manufacturing process is more complicated, its economic benefit is reduced, and the made polarizer has greater thickness, which deteriorates the brightness characteristic.

SUMMARY OF THE INVENTION

A first object of the present invention is to provide a broadband reflection type brightness enhancement polarizer, in which cholesteric liquid crystal films included therein have wide selective reflection wavelength ranges so as to be capable of covering the entire visual ray region only with several liquid crystal films, accordingly ensuring small thickness and economic manufacturing, and a liquid crystal display provided with the polarizer.

A second object of the present invention is to provide a broadband reflection type brightness enhancement polarizer, which solves the conventional problems generated in assembly of a prism film in addition to the aforementioned first object, and a liquid crystal display provided with the polarizer.

A third embodiment of the present invention is to provide a broadband reflection type brightness enhancement polarizer, which improves a viewing angle characteristic in addition to the aforementioned first object, and a liquid crystal display provided with the polarizer.

In order to accomplish the first object, the present invention provides a broadband reflection type brightness enhancement polarizer, which includes (a) a cholesteric liquid crystal film laminate having a broadband selective reflecting wavelength range in which a plurality of cholesteric liquid crystal films having selective reflecting wavelength ranges different from each other by having different mixture ratios of a curable nematic liquid crystal compound expressed by the following chemical formula 1 and a curable chiral compound expressed by the following chemical formula 2 are laminated; and Chemical Formula 1

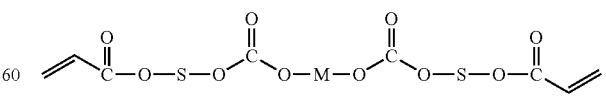

where, in the chemical formula 1, S is a spacer selected from the group consisting of $(CH_2)_m$, $(CH_2CH_2O)_nCH_2CH_2$ and $CH_2CH_2NHCH_2CH_2$ (m is an integer of 1 to 12, and n is an integer of 1 to 3), and M is a Mesogen group selected from the group consisting of:

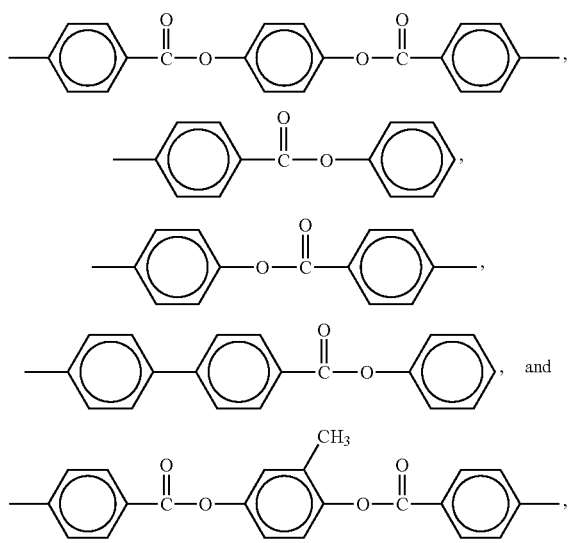

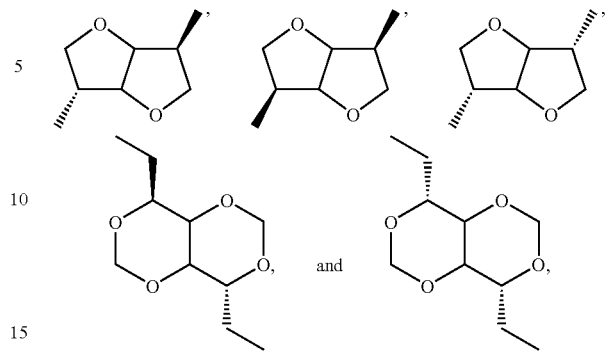

where, in the chemical formula 2, S is a spacer selected from the group consisting of $(CH_2)_m$, $(CH_2CH_2O)_nCH_2CH_2$ and $CH_2CH_2NHCH_2CH_2$ (m is an integer of 1 to 12, and n is an integer of 1 to 3), and M is a Mesogen group selected from the group consisting of:

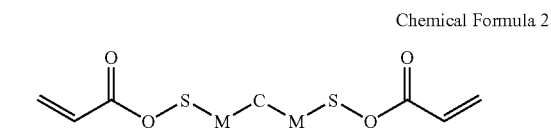

Chemical Formula 2

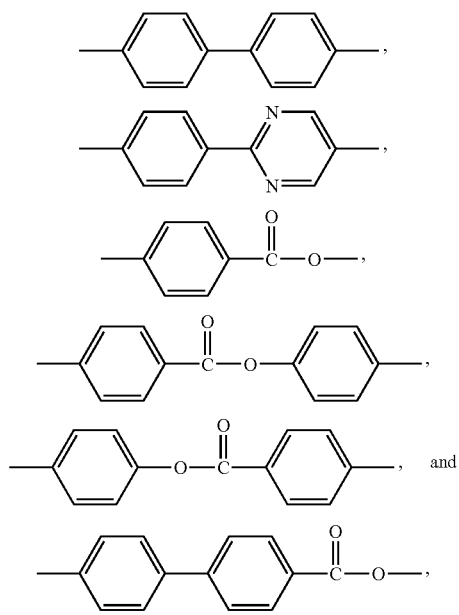

where C is a chiral group selected from the group consisting of:

(b) a film having ¼λ phase difference laminated on one surface of the cholesteric liquid crystal film laminate.

Preferably, the cholesteric liquid crystal film laminate is configured by laminating three sheets of cholesteric liquid crystal films respectively having selective reflecting wavelengths whose center wavelengths are 450 to 480 nm, 530 to 560 nm, and 590 to 630 nm respectively.

In order to accomplish the second object, the broadband reflection type brightness enhancement polarizer according to the present invention further includes a prism pattern coating layer formed on one surface of the broadband reflection type brightness enhancement polarizer.

In order to accomplish the third object, the broadband reflection type brightness enhancement polarizer according to the present invention further includes a light scattering film laminated on one surface of the broadband reflection type brightness enhancement polarizer and having an uneven surface so as to scatter an incident light in unspecified directions.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
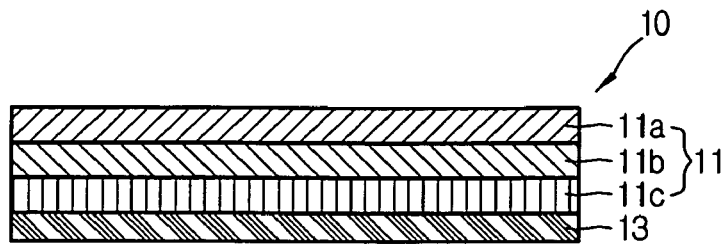
FIG. 1 is a sectional view schematically showing a broadband reflection type brightness enhancement polarizer according to the present invention.

FIG. 1 is a sectional view schematically showing a broadband reflection type brightness enhancement polarizer according to the present invention. Referring to FIG. 1, the broadband reflection type brightness enhancement polarizer 10 according to the present invention is configured so that a film 13 having ¼λ phase difference is laminated on one surface of a cholesteric liquid crystal laminate 11 having a broadband selective reflecting wavelength range.

The cholesteric liquid crystal film laminate 11 is configured so that a plurality of cholesteric liquid crystal films 11a, 11b, 11c having selective reflecting wavelength ranges different from each other by having different mixture ratios of a curable nematic liquid crystal compound expressed by the following chemical formula 1 and a curable chiral compound expressed by the following chemical formula 2 are laminated. That is to say, the cholesteric liquid crystal films 11a, 11b, 11c are respectively formed using the same kind of curable nematic liquid crystal compound and curable chiral compound expressed by the chemical formulas 1 and 2. However, the selective reflecting wavelength region is changed by selecting different mixture ratios of the curable nematic liquid crystal compound and the curable chiral liquid crystal compound.

Chemical Formula 1

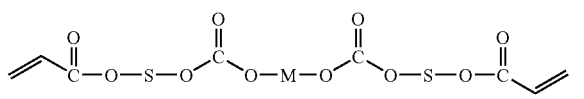

In the chemical formula 1, S is a spacer selected from the group consisting of $(CH_2)_m$, $(CH_2CH_2O)_nCH_2CH_2$ and $CH_2CH_2NHCH_2CH_2$ (m is an integer of 1 to 12, and n is an integer of 1 to 3), and M is a Mesogen group selected from the group consisting of:

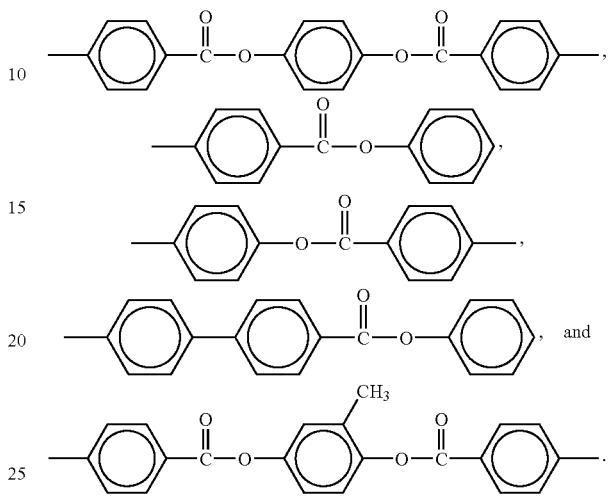

Chemical Formula 2

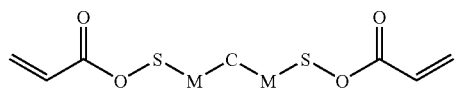

In the chemical formula 2, S is a spacer selected from the group consisting of $(CH_2)_m$, $(CH_2CH_2O)_nCH_2CH_2$ and $CH_2CH_2NHCH_2CH_2$ (m is an integer of 1 to 12, and n is an integer of 1 to 3), and M is a Mesogen group selected from the group consisting of:

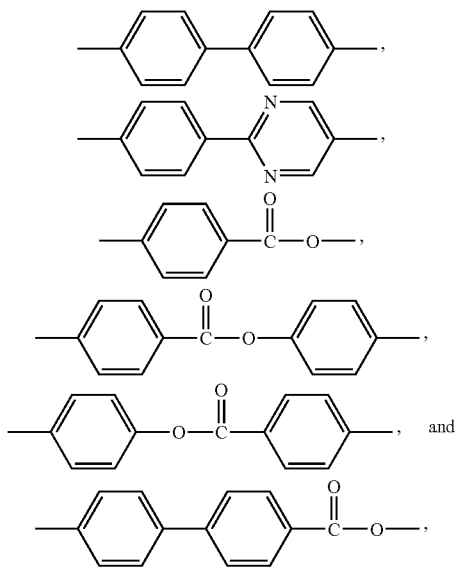

where C is a chiral group selected from the group consisting of:

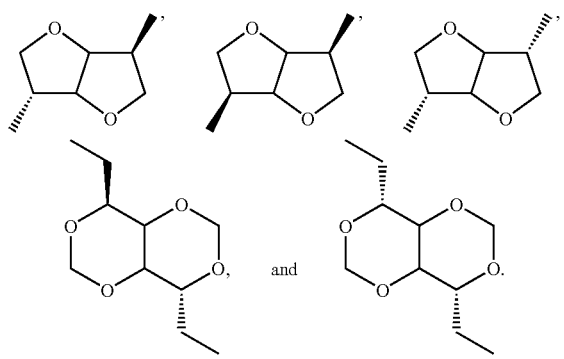

A width of the selective reflecting region of the cholesteric liquid crystal film is changed depending on the nematic liquid crystal compound, and if a cholesteric liquid crystal film is made using the curable nematic liquid crystal compound of the chemical formula 1, it is possible to manufacture a cholesteric liquid crystal film with a greater width of the selective reflecting region. Accordingly, though a small number of cholesteric liquid crystal films are laminated, the entire visible ray region may be covered, thereby capable of providing a thin and economic brightness enhancement polarizer. Meanwhile, the curable chiral compound of the chemical formula 2 has excellent compatibility with the curable nematic liquid crystal compound of the chemical formula 1, which contributes to improvement of polarization characteristics of the cholesteric liquid crystal film.

In the cholesteric liquid crystal film laminate 11, the selective reflecting wavelength regions of the cholesteric liquid crystal films 11a, 11b, 11c are determined depending on a mixture ratio of the curable nematic liquid crystal compound and the curable chiral compound. For example, if the mixture ratio is controlled so that central wavelengths of the selective reflecting wavelength ranges of the cholesteric liquid crystal films are respectively 450 to 480 nm, 530 to 560 nm, and 590 to 630 nm, the visible ray range may be entirely covered just by laminating three sheets of cholesteric liquid crystal films. Laminating sequence of the cholesteric liquid crystal films that compose the cholesteric liquid crystal film laminate is regardless of central wavelengths of their selective reflecting wavelength ranges, and it may be freely decided.

Meanwhile, a film 13 having ¼λ phase difference for converting a circularly polarized light into a linearly polarized light is laminated on one surface of the cholesteric liquid crystal film laminate 11. The ¼λ phase difference film 13 may adopt any ¼λ phase difference film commonly used. In particular, a ¼λ phase difference film having a greater refractive index in a thickness direction rather than in a plane direction is preferably used due to the following reasons.

Figure 2:
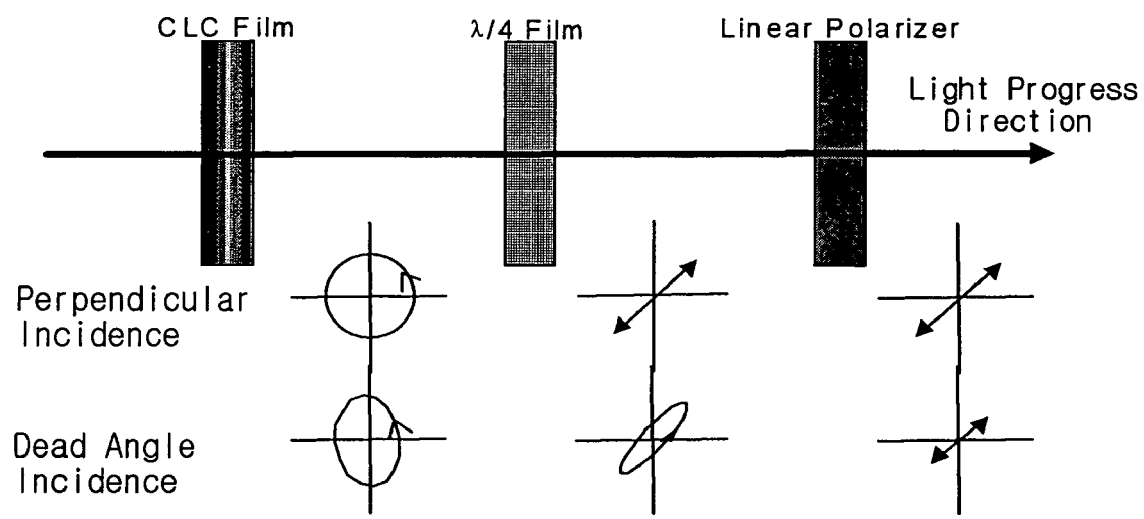
FIG. 2 is a conceptual view showing deflection of a viewing angle of a cholesteric liquid crystal film.
Figure 3:
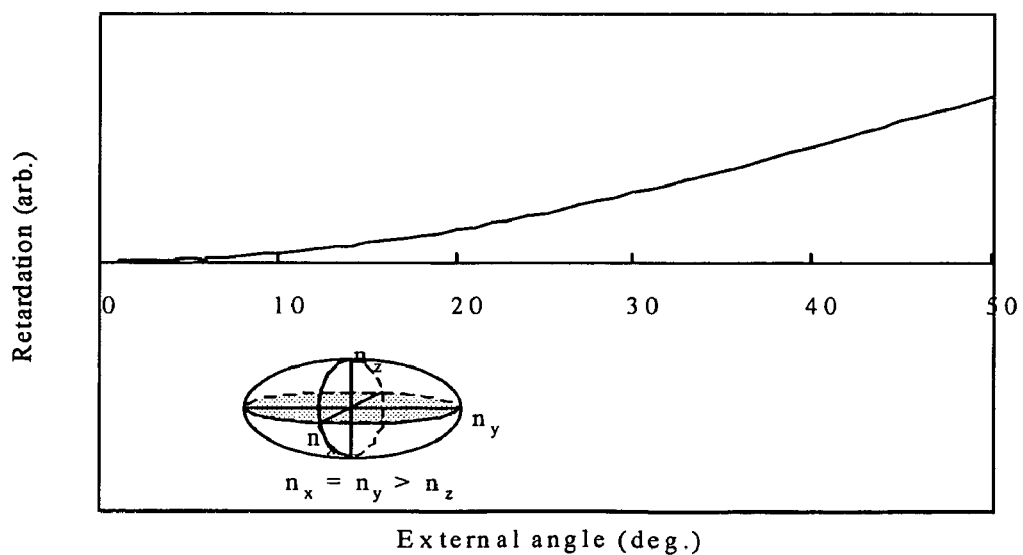
FIG. 3 is a conceptual view showing a phase difference characteristic according to an angle of a cholesteric liquid crystal film.
Figure 4:
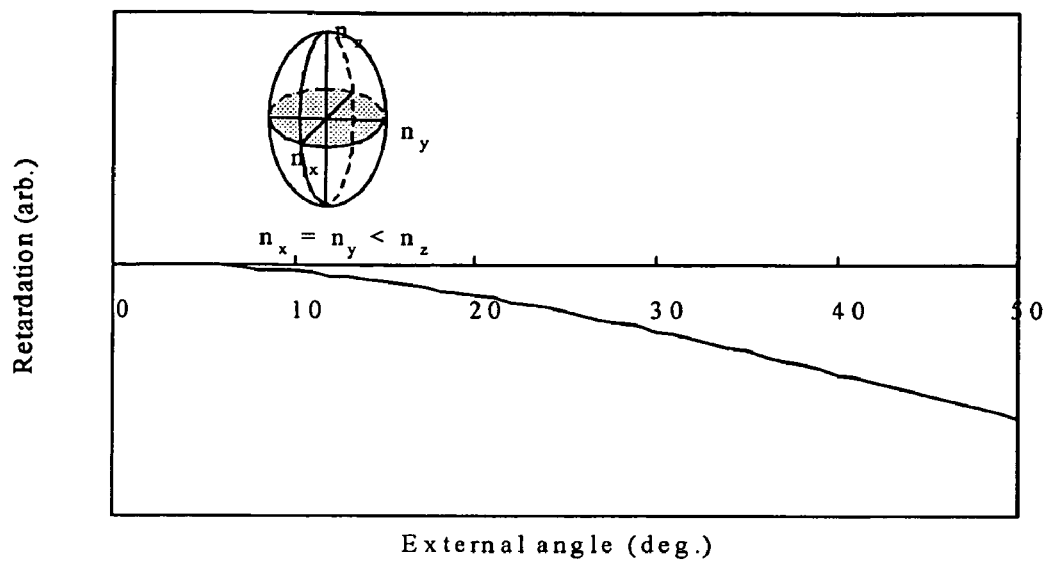
FIG. 4 is a conceptual view showing a phase difference characteristic required for compensation according to an angle.
Figure 5:
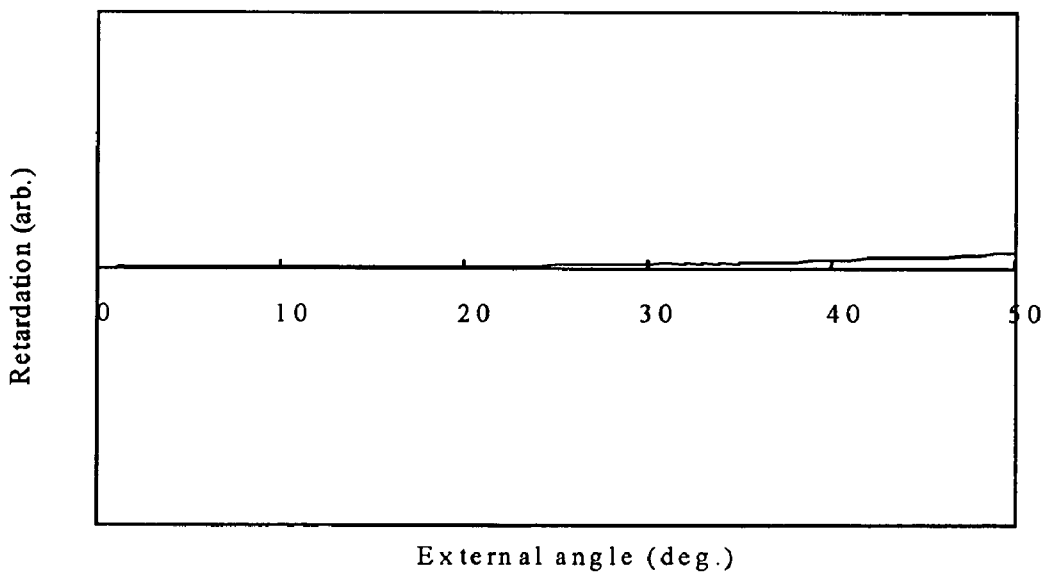
FIG. 5 is a conceptual view showing a phase difference characteristic according to an angle after compensation.

A cholesteric liquid crystal has a characteristic of changing its color depending on a viewing angle. If a film employing such a cholesteric liquid crystal is applied to a backlight of a liquid crystal display, there arises problems of deteriorating brightness and changing a color on the screen depending on a viewing angle. In order to solve these problems, a film capable of compensating such a viewing angle characteristic should be used. As shown in FIG. 2, when light passes through the phase difference film, some light moving through the dead angle cannot be completely changed into a linearly polarized light but into an oval polarized light approximate to a linearly polarized light. Thus, when the light passes through a linear polarizer, components in a transmission axis of the polarizer may pass through it, but the other components are absorbed and their intensities are reduced. Therefore, as an angle is increased, brightness is decreased. Color of transmitting light is changed depending on an incident angle due to the same reason as the brightness is decreased. A color of light seen by the eyes is determined by amounts of the three primary colors of red, green and blue lights. Seeing it on the basis of the above description revealing the reason of brightness reduction, since lights with different colors have different birefringence in the cholesteric liquid crystal film and in the phase difference film, an intensity of light finally passing through the linear polarizer is changed depending on its angle, thereby changing the color of the light. In order to solve this problem related to an angle, a compensation film opposite to birefringence of the cholesteric liquid crystal film should be used. The cholesteric liquid crystal film is isotropic on the film surface, but it is a negative C-plate in which its refractive index in a thickness direction of the film is smaller than a value on the film surface (see FIG. 3), so the compensation film should be a positive C-plate as shown in FIG. 4. That is to say, if a film that is isotropic on the film surface and has a greater refractive index in a thickness direction of the film is used, phase retardation caused by the birefringence of the cholesteric liquid crystal film can be restored. If phase retardations of the cholesteric liquid crystal film and the compensation film are added in FIGS. 3 and 4, a phase retardation value caused by an angle is almost disappeared as shown in FIG. 5. That is to say, phase retardation is disappeared in both cases that light progresses perpendicularly to the film or through the dead angle, so the polarization state of the light is not changed.

As mentioned above, in order to give the above mentioned characteristics, it is preferable to use a phase difference film having a greater refractive index in a thickness direction rather than in a plane direction. Method for manufacturing such a phase difference film is disclosed in Japanese Patent No. 2,612,196, 2,994,013, 2,818,983, 3,309,452, 3,168,850 and so on.

Figure 6:
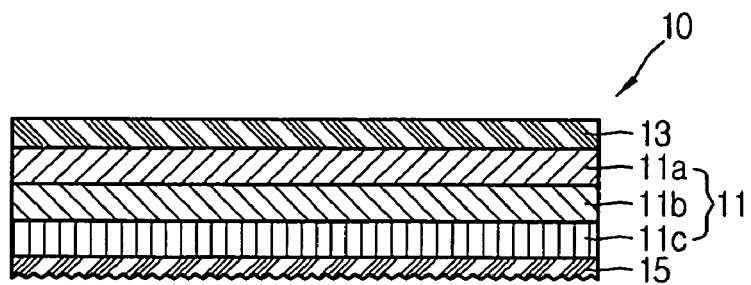
FIGS. 6 and 7 are sectional views showing a broadband reflection type brightness enhancement polarizer on which a prism pattern coating layer is formed according to a preferred embodiment of the present invention.
Figure 7:
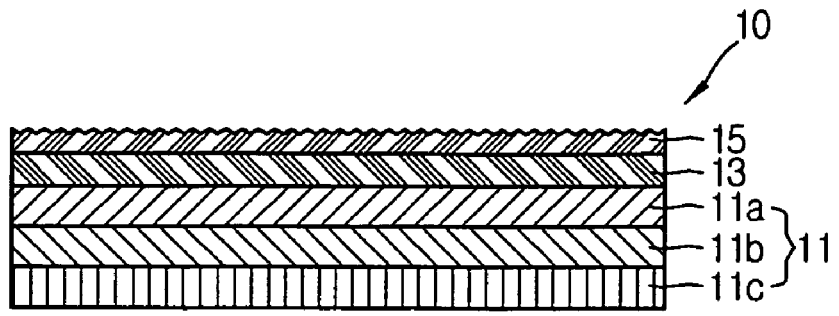

In addition, a coating layer having a prism pattern may be further formed on one surface of the broadband reflection type brightness enhancement polarizer 10 according to the present invention as mentioned above. As shown in FIGS. 6 and 7, the prism pattern coating layer 15 may be formed on the surface opposite to the ¼λ phase difference film 13 or on the ¼λ phase difference film 13, or on both surfaces. The prism pattern coating layer 15 may play a role of a prism film that was separately assembled to a conventional backlight. That is to say, a fine prism structure of the prism pattern concentrates the light entering from a light source into a specific direction (particularly, perpendicular to a light output surface), thereby improving efficiency of the backlight. Arrangement and shape of the prism pattern are not specially limited if light can be concentrated in a specific direction, and for example various patterns such as triangular, semicircular, wave, oval, and cycloidal patterns can be formed as disclosed in Japanese Laid-open Patent Publication H10-319216. A pattern having a triangular prism shape is known to be useful for improving efficiency of the backlight, so the triangular prism pattern is particularly preferred. In case of a broadband reflection type brightness enhancement polarizer further including the prism pattern coating layer formed thereon according to a preferred embodiment of the present invention, cholesteric liquid crystal films composing the polarizer have wider selective reflecting wavelength ranges, so the entire visible ray range are covered by laminating just several liquid crystal films. In addition, there is no need of assembling a separate prism film by adopting the prism pattern coating layer, so it is possible to prevent scratch caused by use of a prism film, contamination caused by impurities, and light loss on the interface.

Figure 8:
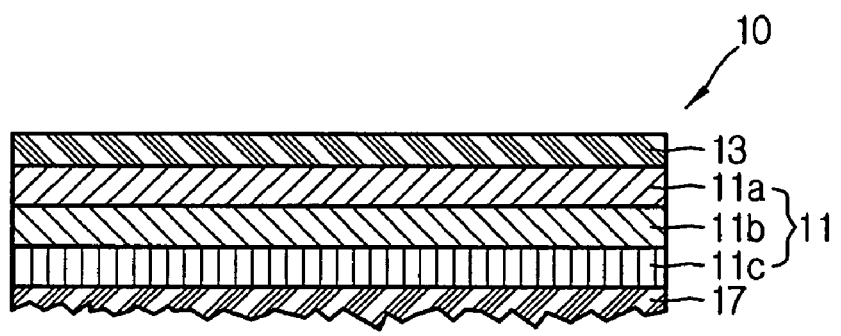
FIGS. 8 and 9 are sectional views showing a broadband reflection type brightness enhancement polarizer on which a light scattering film is laminated according to a preferred embodiment of the present invention.
Figure 9:
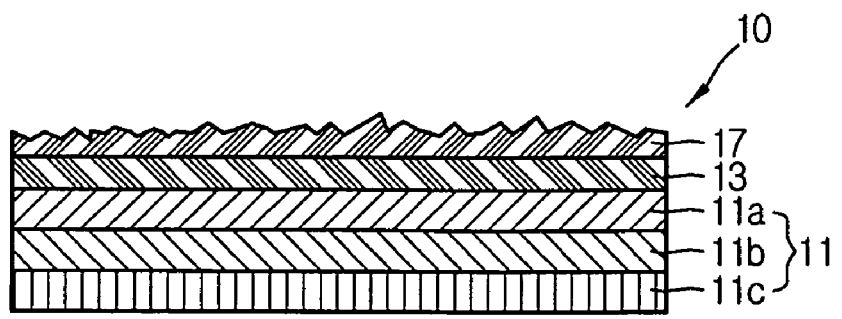

In addition, a light scattering film may be further laminated on one surface of the broadband reflection type brightness enhancement polarizer 10 according to the present invention as mentioned above. On a surface of the light scattering film, unevenness is formed so as to scatter an incident light in unspecified directions. Since an incident light is scattered at various angles due to the uneven structure, a viewing angle characteristic is improved. As an index for evaluating the unevenness on the film surface, Ra is commonly used. Ra is an average height of peaks (or, peaks and valleys) based on a central line of the film surface curve, which is preferably 1.2 to 1.6. As shown in FIGS. 8 and 9, the light scattering film 17 may be formed on the surface opposite to the ¼λ phase difference film 13 or on the ¼λ phase difference film 13, or on both surfaces. Forming method and unevenness shapes of the light scattering film 17 are not specially limited if light can be scattered at various angles in unspecified directions. For example, the film surface itself has the uneven structure, or an uneven structure may be formed on the film surface by mixing a plurality of particles to the film surface. In case of a broadband reflection type brightness enhancement polarizer further including the light scattering layer laminated thereon according to a preferred embodiment of the present invention, cholesteric liquid crystal films composing the polarizer have wider selective reflecting wavelength ranges, so the entire visible ray range are covered by laminating just several liquid crystal films. In addition, since the uneven structure of the light scattering film laminated on one surface of the polarizer scatters an incident light into specified directions, a viewing angle characteristic is improved. Moreover, since all components including the light scattering film are integrated, it is possible to prevent light loss on the interfaces.

Now, a method for manufacturing a broadband reflection type brightness enhancement polarizer according to the present invention is described as follows.

First, a plurality of cholesteric liquid crystal films are prepared to have different selective reflecting wavelength ranges by changing a mixing ratio of the curable nematic liquid crystal compound expressed by the chemical formula 1 and the curable chiral compound expressed by the chemical formula 2. In more detail, the curable nematic liquid crystal compound of the chemical formula 1 and the curable chiral compound of the chemical formula 2 are melted in an organic solvent together with an optical initiator at a predetermined ratio, and then roll-coated on a substrate. After that, the solvent is dried with passing it through a drier to make an alignment in the liquid crystal material, and then irradiates UV thereto to manufacture a cholesteric liquid crystal film having a predetermined selective reflecting wavelength range. In the same way, cholesteric liquid crystal films having different selective reflecting wavelength ranges are prepared with changing a mixture ratio of the curable nematic liquid crystal compound of the chemical formula 1 and the curable chiral compound of the chemical formula 2.

Subsequently, the plurality of cholesteric liquid crystal films having different selective reflecting wavelength ranges are laminated to make a cholesteric liquid crystal film laminate having a broadband selective reflecting wavelength range. The laminating method is not limited if it can integrate all cholesteric liquid crystal films, but it is convenient to laminate them using an adhesive.

After that, a ¼λ phase difference film is laminated on one surface of the made cholesteric liquid crystal film laminate to make a broadband reflection type polarizer. The method for laminating the ¼λ phase difference film is also convenient when using an adhesive.

Figure 10:
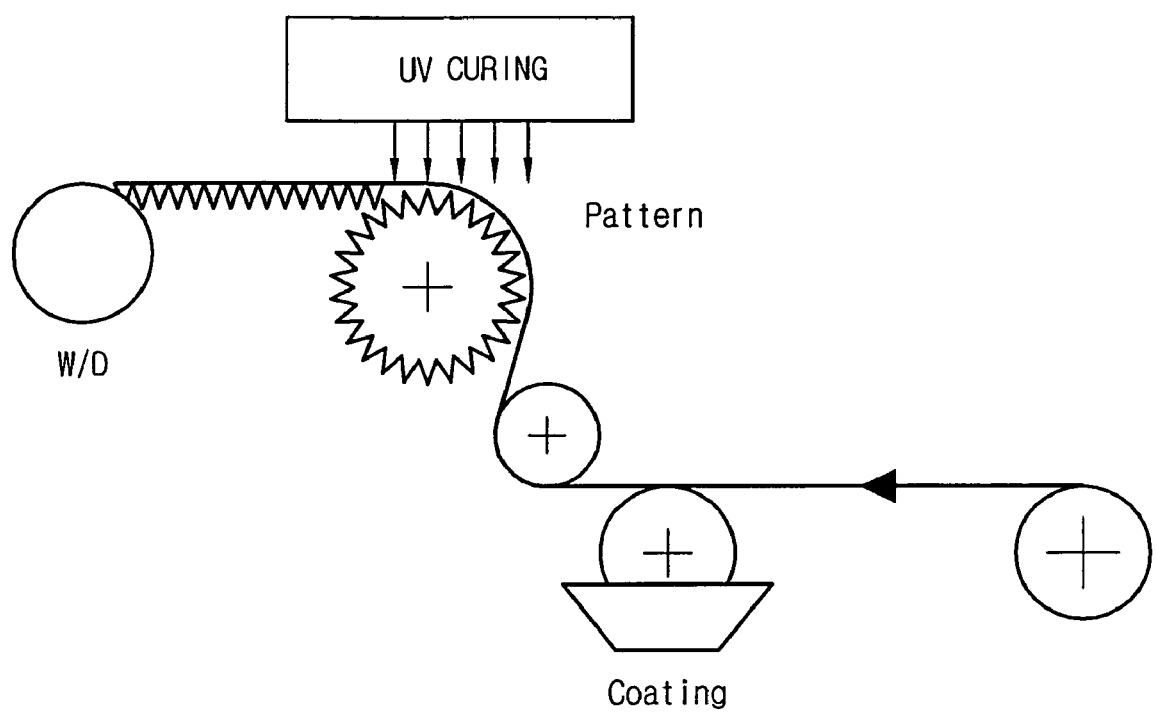
FIG. 10 is a schematic view illustrating the process of manufacturing a broadband reflection type brightness enhancement polarizer on which a prism pattern coating layer is formed according to one embodiment of the present invention.

In case a prism pattern coating layer is further formed on one surface of the broadband reflection type brightness enhancement polarizer, the following process is added. A photocurable resin liquid is coated on one surface of the broadband reflection type polarizer prepared according to the above method. The photocurable resin liquid preferably employs a resin liquid composed of monomer or oligomer that is curable by light, not using a solvent. For example, a solution in which acrylate monomer and additives are formulated can be used as the photocurable resin liquid. In particular, the photocurable resin liquid may employ various monomers having aromatic groups, more preferably a resin containing oligomer, monomer or their mixture that includes many benzene rings, which may be cured by UV or electronic beam. For example, an oligomer having an aromatic group such as bisphenol-A polyphenylene diacrylate and bisphenol-A polyetoxylate diacrylate oligomer, and a monomer having an aromatic group such as 2-hydroxy-3-phenoxy-propyl acrylate and bisphenol-A diethylene diacrylate are used in single or in mixture, and an optical initiator for curing the oligomer and/or the monomer is added to the above composition. As a coating method, a resin liquid of a certain thickness may be coated on the substrate using a gravure roll coating machine or a comma coating machine. At this time, the coating liquid put on the substrate film by the coating machine preferably has a thickness of 10 to 45 μm, more preferably 15 to 25 μm. After that, light is irradiated to the surface on which the photocurable resin liquid is coated, with passing through rolls on which a prism pattern is embossed, thereby forming the prism pattern on the surface. FIG. 10 shows the process of forming the prism pattern. Referring to FIG. 10, while the surface coated with the photocurable resin liquid passes through the rolls on which a prism pattern is embossed, the embossed prism pattern presses down the photocurable resin liquid to form the pattern on the surface. Meanwhile, a light irradiating machine positioned at an opposite direction to the rolls irradiates light to fix the formed pattern.

In addition, a process of further laminating a light scattering film on one surface of the broadband reflection type brightness enhancement polarizer is selectively added as follows. The light scattering film is laminated on one surface of the broadband reflection type polarizer prepared as mentioned above. The light scattering film is conveniently laminated in an adhering method using an adhesive. For making the light scattering film, the film surface extruded according to the above method passes through rolls on which an uneven structure is embossed, or a plurality of particles are mixed to the film surface to form the uneven structure as disclosed in Korean Laid-open Patent Publication No. 2002-35607.

The broadband reflection type brightness enhancement polarizer according to the present invention as mentioned above may be usefully provided to a liquid crystal device.

Hereinafter, embodiments of the present invention will be explained in detail for better understanding of the present invention. However, the embodiments of the present invention may be modified into various ways, and the scope of the invention should not be interpreted to be limited to the following embodiments. The embodiments of the present invention are just given for illustrating the present invention more perfectly to those having ordinary skill in the art.

Embodiment 1

First, three sheets of cholesteric liquid crystal films having different selective reflecting wavelength ranges were prepared. A curable nematic liquid crystal compound (LC1057 manufactured by BASF) and a curable chiral compound (LC756 manufactured by BASF) were dissolved into cyclopentanone in a concentration of 30 wt %. When preparing each cholesteric liquid crystal film, 7.7 wt %, 6.2 wt % and 5.5 wt % of chiral compound were respectively added in comparison to the content of each nematic liquid crystal compound, and 5 wt % of optical initiator (IG184, Ciba-Geigy) and 0.2 wt % of leveling agent (BYK361, BYK) were added thereto as additives. The prepared solutions were respectively roll-coated on a polyethylene terephthalte coated with a parallel alignment layer, and their liquid crystals were aligned with drying the solvent in a drier, and then UV ray was irradiated thereto to make cholesteric liquid crystal films. A drying condition was 85° C., and 300 W lamp (with a central wavelength of 360 nm) was used for UV irradiation. The obtained cholesteric liquid crystal films had selective reflecting ranges whose central wavelengths were respectively 470 nm, 535 nm and 600 nm.

The prepared cholesteric liquid crystal films were adhered under pressure using an adhesive in the order from a cholesteric liquid crystal film having short central wavelength to a cholesteric liquid crystal film having a long central wavelength. The adhesive was in a liquid state, and like a liquid material coating, the adhesive was coated thin using a roll-coating method, the solvent was dried in a drier, and then the films were compressed. After compression, they were aged for a certain time for complete adhesion. The laminated liquid crystal films had a thickness of about 13 µm.

A ¼λ phase difference film (with a thickness of 50 µm, a phase difference of 110 nm, Nx: 1.5817, Ny: 1.5795, Nz: 1.5778) coated with pressure sensitive adhesive (PSA) on a short wavelength surface of the liquid crystal film laminate prepared as mentioned above was compressed at a room temperature, thereby manufacturing a final brightness enhancement polarizer.

Embodiment 2

A brightness enhancement polarizer was manufactured in the same way as in the embodiment 1, except for using a ¼λ phase difference film with a phase difference of 115 nm, Nx: 1.5806, Ny: 1.5783, Nz: 1.5841.

COMPARATIVE EXAMPLE 1

A polarizer was manufactured in the same way as in the embodiment 1, except that RMS 02, manufactured by Merck, and RMS 03, manufactured by Merck, were used as the curable nematic liquid crystal compound and the curable chiral compound.

Figure 11:
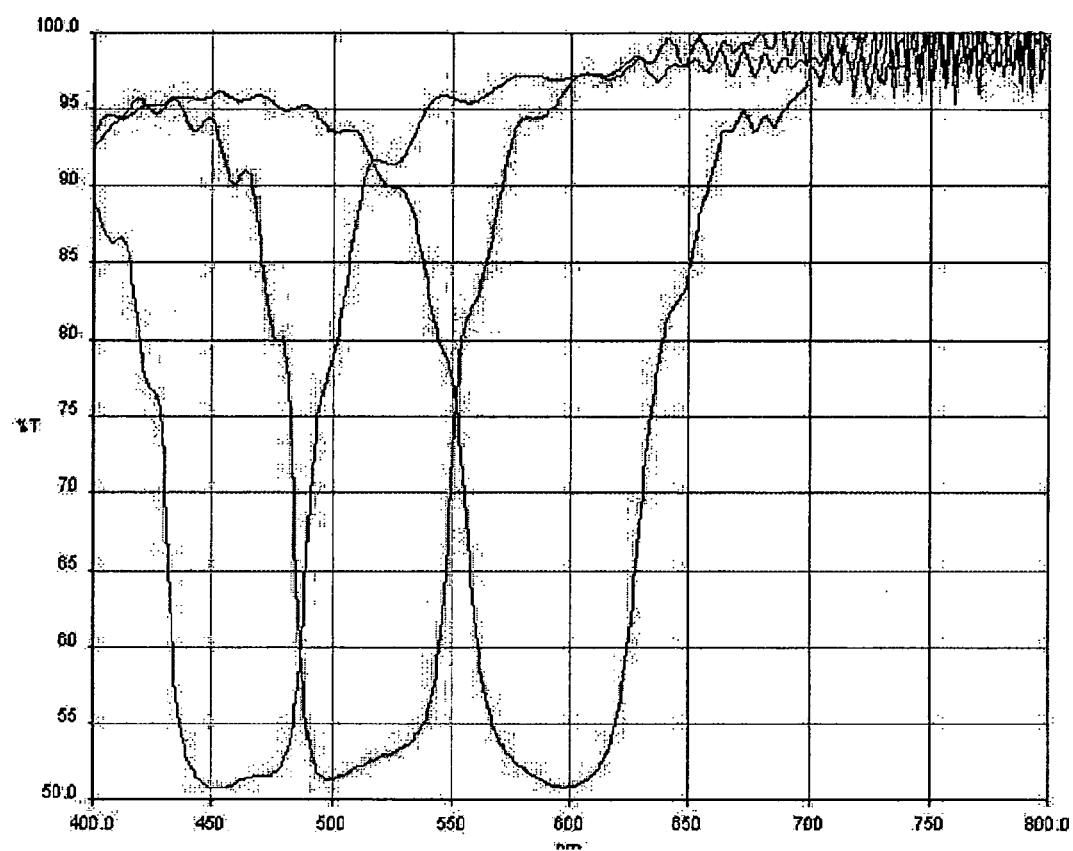
FIG. 11 shows a spectrum of a selective reflecting region of a broadband reflection type brightness enhancement polarizer according to a first embodiment of the present invention.
Figure 12:
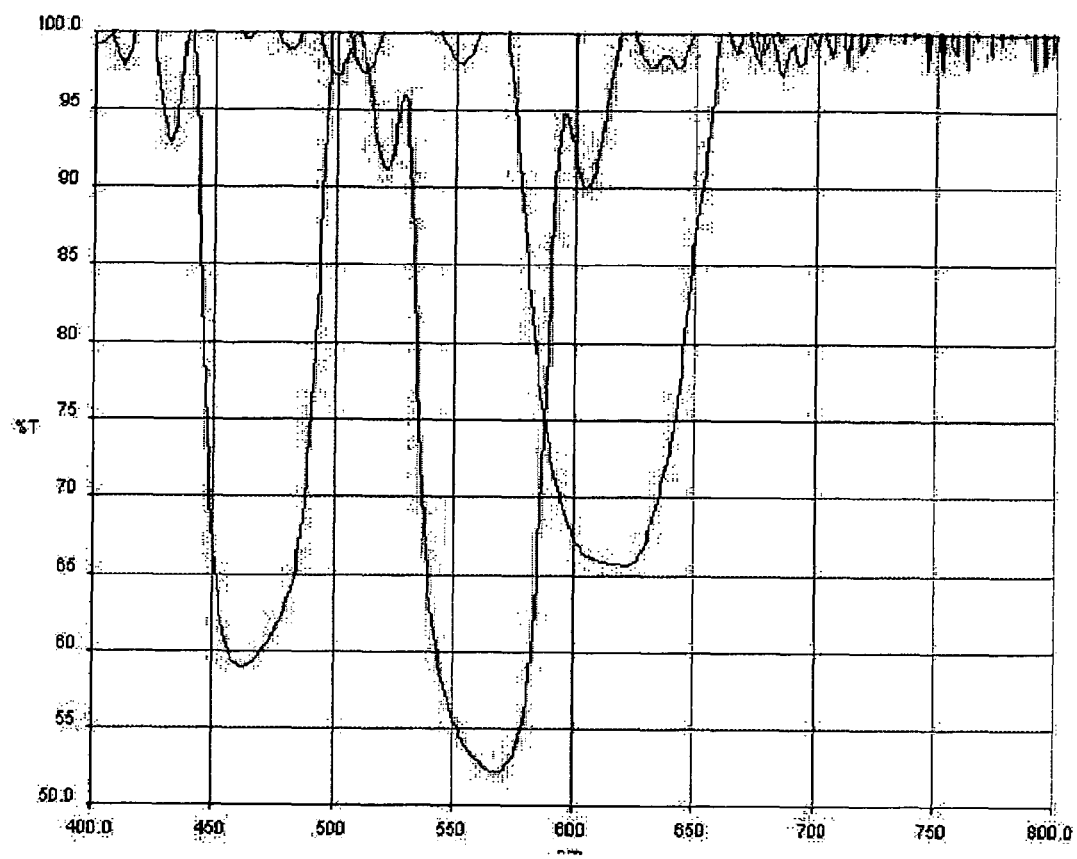
FIG. 12 shows a spectrum of a selective reflecting region of a polarizer according to a first comparative example.

Selective reflecting range spectrums of the polarizers manufactured according to the embodiment 1 and the comparative example 1 are shown in FIGS. 11 and 12. Referring to FIG. 11, it will be understood that the polarizer in which cholesteric liquid crystal films formed by the curable nematic liquid crystal compound and the curable chiral compound according to the present invention are laminated has a wide selective reflecting range, so it may cover the entire visible ray range just by laminating three liquid crystal films. However, as shown in FIG. 12, it is understood that the polarizer in which cholesteric liquid crystal films formed by common nematic liquid crystal compound and common chiral compound has a visible ray range not covered, so it has a problem in realizing enhanced brightness. In fact, as a result of installing the polarizers of the embodiment 1 and the comparative example 1 and then measuring their brightness, assuming that a brightness when not using a reflection type polarizer is 100, brightness was 135 when the polarizer of the embodiment 1 was installed, and brightness was 125 when the polarizer of the comparative example 1 was installed.

Figure 13:
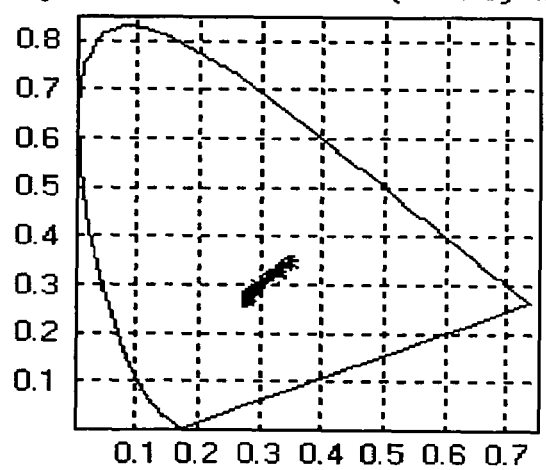
FIG. 13 is a graph showing a viewing angle characteristic of a broadband reflection type brightness enhancement polarizer according to a second embodiment of the present invention.
Figure 14:
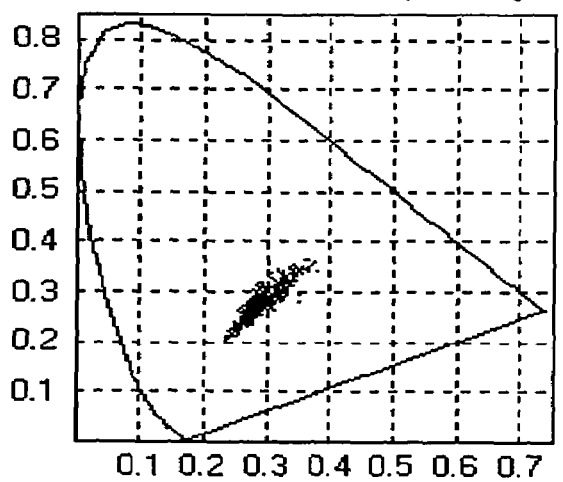
FIG. 14 is a graph showing a viewing angle of the broadband reflection type brightness enhancement polarizer according to the first embodiment of the present invention.

Meanwhile, FIGS. 13 and 14 are graphs showing the viewing angle characteristics of the polarizers according to the embodiment 2 and the embodiment 1, respectively. It will be found that the polarizer of the embodiment 2 on which a ¼λ phase difference film having a greater refractive index in a thickness direction rather than in a plane direction is laminated (see FIG. 13) has smaller color coordinate deflection than the polarizer of embodiment 1 (see FIG. 14).

Embodiment 3

A UV curable resin liquid was coated on the phase different film attachment surface of the broadband reflection type polarizer manufactured according to the embodiment 1. The UV curable resin liquid includes a curable composition that contains 60 wt % of bisphenol-A polyphenylene diacrylate oligomer and 40 wt % of 2-hydroxy-3-phenoxy-propyl acrylate monomer, and 3 wt % of Merck initiator "Darocure 1173" with respect to the entire content of the curable composition was mixed with the curable composition as an initiator.

Subsequently, the UV curable resin liquid was coated in a thickness of 30 µm through the procedure shown in FIG. 10, and a vertical angle of the prism was fixed through the UV curing device with pressing a pattern, thereby manufacturing a broadband reflection type brightness enhancement polarizer in which a prism pattern coating layer is formed. The made prism has a refractive index of 1.60 and a vertical angle of 90 degrees.

Embodiment 4

A broadband reflection type brightness enhancement polarizer in which a prism pattern coating layer was formed in the same way as in the embodiment 3 was manufactured, except that the prism pattern coating layer is formed on a surface opposite to the phase difference film attachment surface.

When the broadband reflection type brightness enhancement polarizers in which a prism pattern coating layer is formed according to the embodiments 3 and 4 were installed to a liquid crystal device, it was found that brightness was improved by about 3% rather than a liquid crystal device in which a common prism film (BEF-II, manufactured by 3M) is placed on the broadband reflection type brightness enhancement polarizer of the embodiment 1.

Embodiment 5

A broadband reflection type brightness enhancement polarizer was manufactured in the same way as the embodiment 1, except that a film having a thickness of 50 µm and a phase difference of 135 nm (manufactured by Teijin) was used as the ¼λ phase difference film coated with a pressure sensitive adhesive (PSA).

Embodiment 6

A broadband reflection type brightness enhancement polarizer in which a light scattering film (a polycarbonate extrusion film with 1.4 Ra, manufactured by GE) was adhered and laminated onto the phase difference film of the embodiment 5 by passing an extruded film surface through a roll having an embossed uneven structure.

Figure 15:
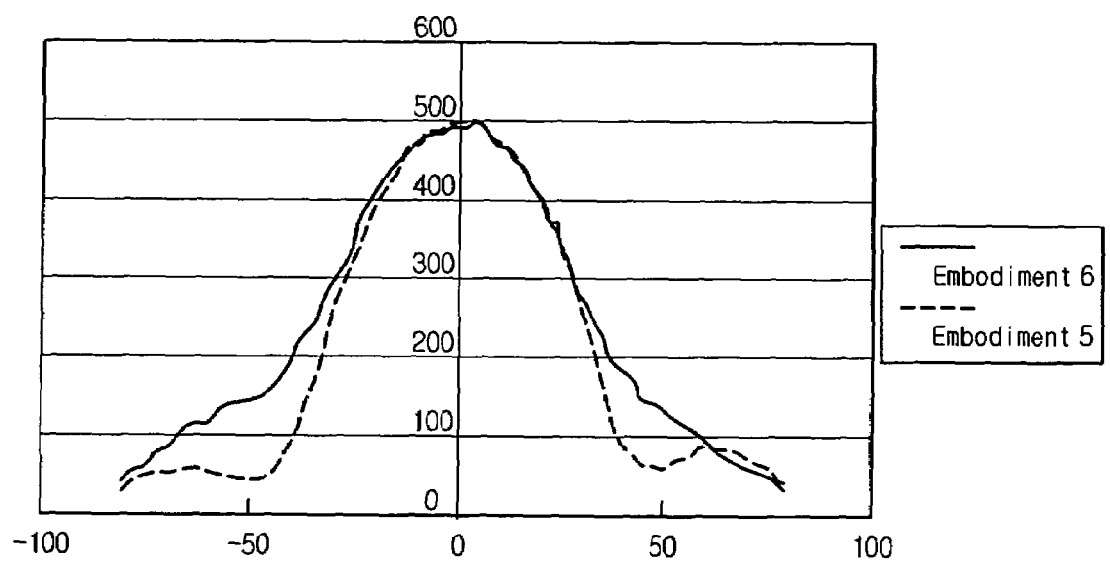
FIG. 15 is a graph showing viewing angle characteristics of broadband reflection type brightness enhancement polarizers according to fifth and sixth embodiments.

FIG. 15 is a graph showing viewing angle characteristics of the broadband reflection type brightness enhancement polarizers according to the embodiments 5 and 6. As shown in FIG. 15, it would be found that the broadband reflection type brightness enhancement polarizers on which the light scattering film is laminated according to the embodiment 6 has more excellent viewing angle characteristic than the broadband reflection type brightness enhancement polarizers according to the embodiment 5 on which a light scattering film is not laminated.

APPLICABILITY TO THE INDUSTRY

First, the cholesteric liquid crystal films composing the broadband reflection type brightness enhancement polarizers according to the present invention have wide selective reflecting wavelength ranges, so the entire visible ray range can be covered just by laminating a small number of liquid crystal films. Accordingly, the broadband reflection type brightness enhancement polarizers has a relatively smaller thickness and thus maximize improvement of brightness when it is used for a liquid crystal display, and also a manufacturing procedure is reduced to give better economic benefits.

Second, if a ¼λ phase difference film having a greater refractive index in a thickness direction rather than in a plane direction is laminated on one surface of the broadband reflection type brightness enhancement polarizers according to the present invention, a color coordinate deflection depending on an angle is decreased, thereby capable of giving excellent viewing angle characteristics.

Third, if a prism pattern coating layer is formed on one surface of the broadband reflection type brightness enhancement polarizers according to the present invention, light loss can be prevented in interfaces, thereby enhancing the brightness further.

Fourth, if a light scattering film is integrally laminated on one surface of the broadband reflection type brightness enhancement polarizers according to the present invention, an incident light is scattered in unspecified direction due to the uneven structure of the surface of the light scattering film, thereby improving a viewing angle characteristic of a liquid crystal device.

What is claimed is:

1. A broadband brightness enhancement polarizer, comprising:
   (a) a cholesteric liquid crystal film laminate having a broadband selective reflecting wavelength range in which a plurality of cholesteric liquid crystal films having selective reflecting wavelength ranges different from each other by having different mixture ratios of a curable nematic liquid crystal compound expressed by the following chemical formula 1 and a curable chiral compound expressed by the following chemical formula 2 are laminated; and Chemical Formula 1

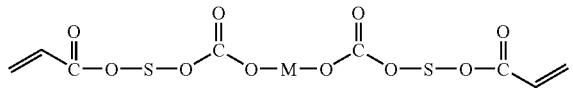

where, in the chemical formula 1, S is a spacer selected from the group consisting of $(CH_2)_m$, $(CH_2CH_2O)_nCH_2CH_2$ and $CH_2CH_2NHCH_2CH_2$ (m is an integer of 1 to 12, and n is an integer of 1 to 3), and M is a Mesogen group selected from the group consisting of:

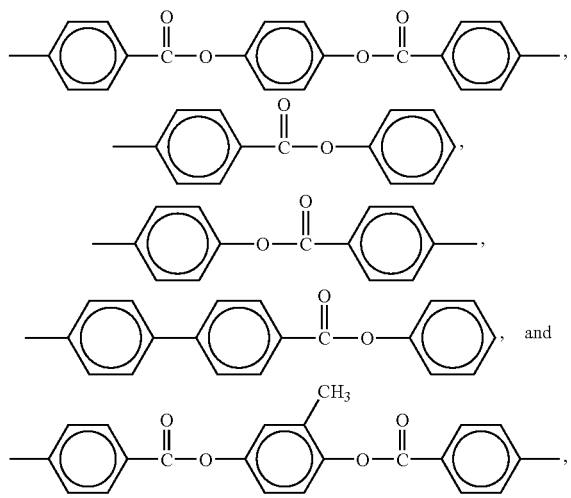

Chemical Formula 2

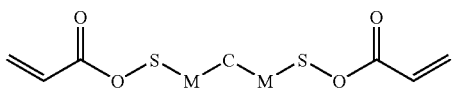

where, in the chemical formula 2, S is a spacer selected from the group consisting of $(CH_2)_m$, $(CH_2CH_2O)_nCH_2CH_2$ and $CH_2CH_2NHCH_2CH_2$ (m is an integer of 1 to 12, and n is an integer of 1 to 3), and M is a Mesogen group selected from the group consisting of:

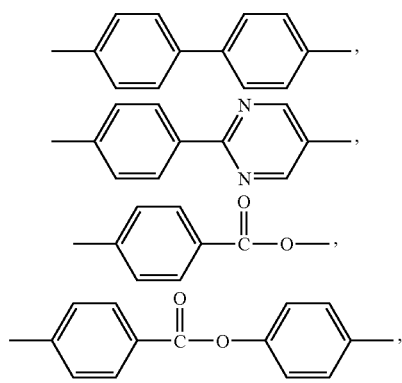

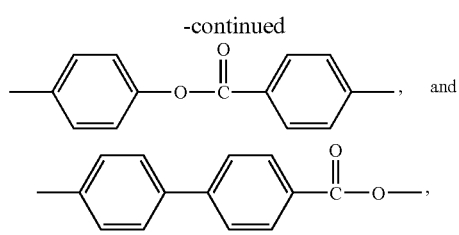

where C is a chiral group selected from the group consisting of:

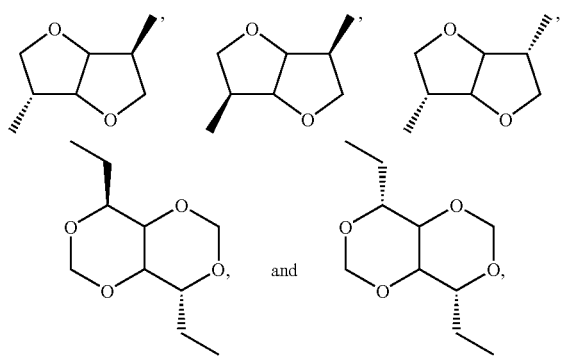

(b) a film having ¼λ phase difference laminated on one surface of the cholesteric liquid crystal film laminate.

2. The broadband brightness enhancement polarizer according to claim 1, wherein the cholesteric liquid crystal film laminate is configured by laminating three sheets of cholesteric liquid crystal films respectively having selective reflecting wavelengths whose center wavelengths are 450 to 480 nm, 530 to 560 nm, and 590 to 630 nm respectively.

3. The broadband brightness enhancement polarizer according to claim 2, wherein the cholesteric liquid crystal film laminate is configured by laminating three sheets of cholesteric liquid crystal films respectively having selective reflecting wavelengths whose center wavelengths are 480 nm, 560 nm, and 620 nm respectively.

4. The broadband brightness enhancement polarizer according to claim 1, wherein the film having ¼.lamda. phase difference has a greater refractive index in a thickness direction rather than in a plane direction.

5. The broadband reflection brightness enhancement polarizer according to claim 1, further comprising a prism pattern coating layer formed on one surface of the broadband reflection brightness enhancement polarizer.

6. The broadband brightness enhancement polarizer according to claim 1, further comprising a light scattering film laminated on one or both surfaces of the broadband reflection type brightness enhancement polarizer and having an uneven surface so as to scatter an incident light in unspecified directions.

7. The broadband brightness enhancement polarizer according to claim 6, wherein the light scattering film has Ra of 1.2 to 1.6.

8. A liquid crystal device comprising the broadband brightness enhancement polarizer defined claim 1.

* * * * *